United States Patent
VanBlon et al.

(10) Patent No.: US 10,135,961 B2
(45) Date of Patent: Nov. 20, 2018

(54) SYSTEMS AND METHODS TO DISABLE CALLER IDENTIFICATION BLOCKING

(71) Applicant: Lenovo (Singapore) Pte. Ltd., New Tech Park (SG)

(72) Inventors: Russell Speight VanBlon, Raleigh, NC (US); Nathan J. Peterson, Oxford, NC (US); John Carl Mese, Cary, NC (US); Arnold S. Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/480,551

(22) Filed: Apr. 6, 2017

(65) Prior Publication Data
US 2018/0295224 A1  Oct. 11, 2018

(51) Int. Cl.
| | | |
|---|---|---|
| H04M 1/57 | (2006.01) | |
| H04M 3/42 | (2006.01) | |
| H04L 12/58 | (2006.01) | |
| H04M 1/56 | (2006.01) | |

(52) U.S. Cl.
CPC ............ *H04M 1/571* (2013.01); *H04L 51/10* (2013.01); *H04M 1/56* (2013.01); *H04M 3/42042* (2013.01)

(58) Field of Classification Search
None
See application file for complete search history.

(56) References Cited

U.S. PATENT DOCUMENTS

| | | | | |
|---|---|---|---|---|
| 6,449,497 B1* | 9/2002 | Kirbas | ............ | H04M 1/274566 455/564 |
| 8,085,922 B1* | 12/2011 | Smith | .............. | H04M 3/44 379/216.01 |
| 2003/0053444 A1* | 3/2003 | Swartz | ............. | H04L 51/066 370/352 |
| 2003/0063732 A1* | 4/2003 | Mcknight | ........ | H04M 1/274575 379/210.01 |
| 2006/0088148 A1* | 4/2006 | Frank | ................ | H04M 15/06 379/142.01 |
| 2006/0140200 A1* | 6/2006 | Black | ................ | H04L 29/06027 370/401 |
| 2013/0166555 A1* | 6/2013 | Pfaff | ............... | H04M 1/274583 707/737 |
| 2015/0052486 A1* | 2/2015 | Goodman | ........... | G06F 3/04817 715/835 |

* cited by examiner

*Primary Examiner* — German Viana Di Prisco
(74) *Attorney, Agent, or Firm* — John L. Rogitz; John M. Rogitz (57) ABSTRACT

In one aspect, a first device includes a processor and storage accessible to the processor. The storage bears instructions executable by the processor to identify contact information for a person associated with a second device and determine, based on the identification, whether to disable a caller identification (ID) blocking function associated with making calls from the first device. The instructions are also executable by the processor to, responsive to a determination to disable the caller ID blocking function, disable the caller ID blocking function while facilitating a call from the first device to the second device.

20 Claims, 5 Drawing Sheets

SYSTEMS AND METHODS TO DISABLE CALLER IDENTIFICATION BLOCKING

BACKGROUND

Blocking one's telephone number from being presented at a device to which a call is being made may have numerous benefits, including privacy benefits such as the recipient of the telephone call not being able to ascertain the telephone number and the telephone number therefore not being used later for future calling or dissemination without the telephone number owner's approval. As recognized herein, such blocking is often done for every call that is made using a given telephone number.

However, some people will not answer a call when being received via a telephone number that is blocked, which can lead to an inability of the person with the blocked telephone number to communicate with those people. As further recognized herein, this can be particularly frustrating when the caller and the other person know each other fairly well and hence the caller would not mind if the other person ended up being able to ascertain the telephone number used by the caller. There are currently no adequate solutions to the foregoing computer-related problem.

SUMMARY

Accordingly, in one aspect a first device includes a processor and storage accessible to the processor. The storage bears instructions executable by the processor to identify contact information for a person associated with a second device and determine, based on the identification, whether to disable a caller identification (ID) blocking function associated with making calls from the first device. The instructions are also executable by the processor to, responsive to a determination to disable the caller ID blocking function, disable the caller ID blocking function while facilitating a call from the first device to the second device.

In another aspect, a method includes identifying, using a first device, information pertaining to a person associated with a second device. The method also includes determining, based on the identifying, to not block a phone number associated with the first device from being identified at the second device while a call from the first device to the second device is facilitated. The method further includes permitting, responsive to determining to not block the phone number from being identified at the second device, data indicating the phone number to be presented at the second device while facilitating the call.

In still another aspect, a method includes facilitating a telephone call between a first device and a second device and determining whether to block a phone number associated with the first device from being presented at the second device while facilitating the telephone call between the first device and the second device. The determining whether to block the phone number associated with the first device from being presented at the second device while facilitating the telephone call is based on information associated with a user of the second device. The method also includes unblocking the phone number so that the phone number may be presented at the second device, with the unblocking being performed responsive to a determination to not block the phone number from being presented at the second device while facilitating the telephone call.

The details of present principles, both as to their structure and operation, can best be understood in reference to the accompanying drawings, in which like reference numerals refer to like parts, and in which:

DETAILED DESCRIPTION

Disclosed below are systems and methods for unblocking the telephone number of a user when the user places a call to a recipient using his or her telephone. This may be useful when, for instance, the user's telephone or telephone service provider would otherwise automatically block the user's telephone number from being identified by the recipient's caller identification (ID) feature when receiving the call from the user, but where the user does not mind that particular recipient being able to identify the user's telephone number.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

Figure 1:
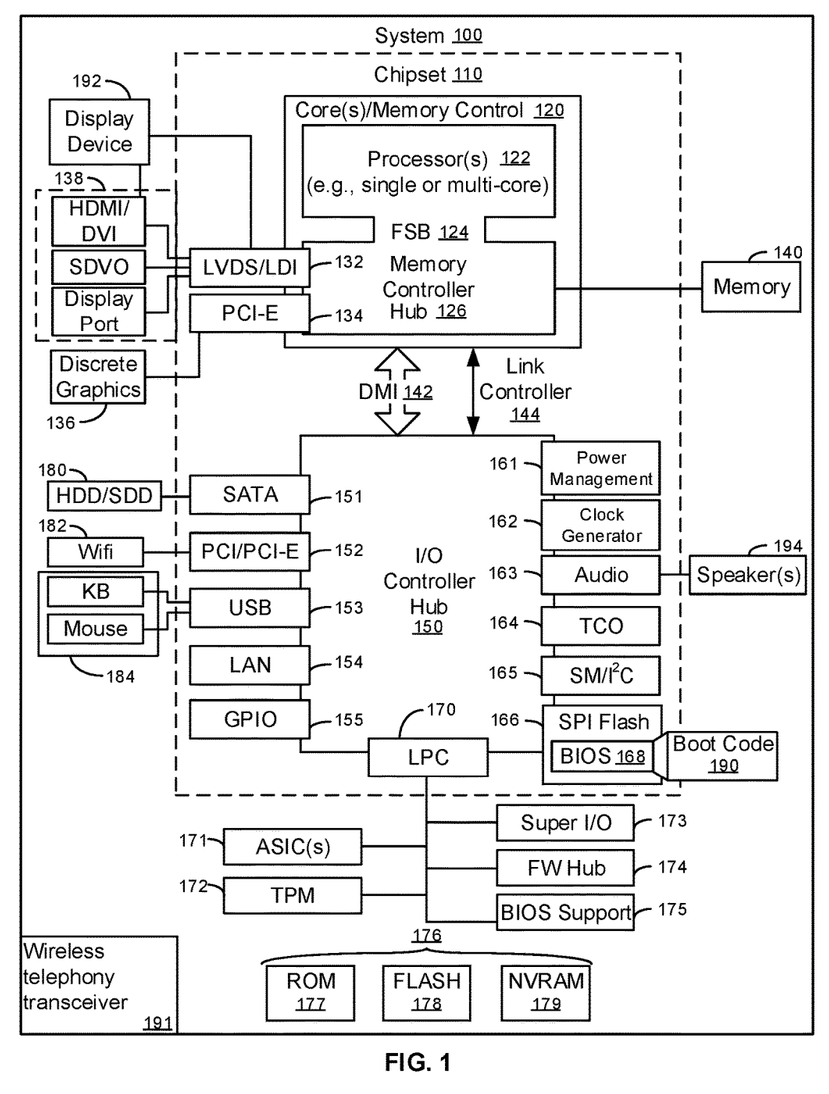
FIG. 1 is a block diagram of an example system in accordance with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one or more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 may also include a telephony transceiver 191 accessible to the processor 122, such as a wireless cellular telephony transceiver, for communication over a telephone network in accordance with present principles. The telephone network may include, for example, a wireless cellular network operated by a telephone services provider.

Additionally, and though not shown for clarity, in some embodiments the system 100 may include a gyroscope that senses and/or measures the orientation of the system 100 and provides input related thereto to the processor 122, and an accelerometer that senses acceleration and/or movement of the system 100 and provides input related thereto to the processor 122. The system 100 may further include an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video.

Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
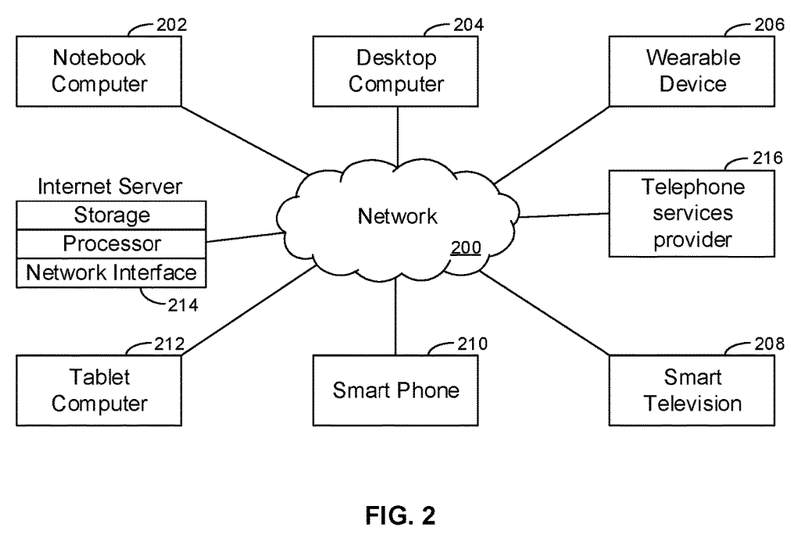
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a telephone services provider and/or telephone communications company computer 216, and a server 214 such as an Internet server that may provide cloud storage accessible to the devices 202-212, 216. It is to be understood that the devices 202-216 are configured to communicate with each other over the network 200 to undertake present principles. For example, the smart phone 210 may call another telephone through the telephone services provider computer 216.

Figure 3:
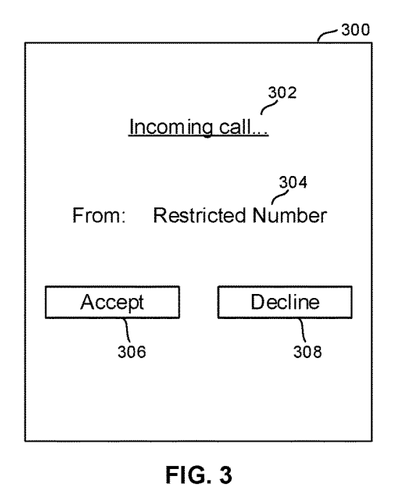
FIGS. 3 and 4 show example user interfaces (UI) pertaining to incoming telephone calls in accordance with present principles.

Turning now to FIG. 3, an example user interface (UI) 300 is shown of what receiving a call might look like at a smart phone that is being made by a person using a restricted telephone number. As shown on the UI 300, an indication 302 of an incoming telephone call may be presented along with an indication 304 for the smart phone's caller identification (ID) function that caller ID is not available since the telephone number being used to call the smart phone is "restricted". Call accept and call decline selectors 306, 308 are also shown. Some users might still accept the call by selecting selector 306, but it is to be understood in accordance with present principles that some other users might decline to accept the call by selecting selector 308 simply because the telephone number is "restricted" and hence the user cannot verify whom is trying to call him or her. Furthermore, some users might even have their incoming telephone call settings configured such that calls from "restricted" numbers are automatically declined, and hence some users might not even receive the call at all when the number is restricted or blocked.

Figure 4:
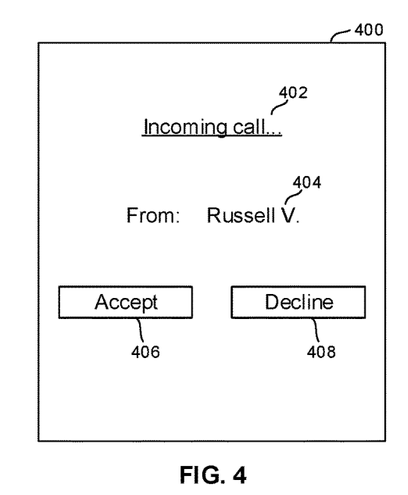

FIG. 3 is in contrast to FIG. 4. FIG. 4 shows a UI 400 that may also be presented on the user's smart phone. The UI 400 includes an indication 402 of an incoming telephone call. Furthermore, the smart phone's caller identification (ID) function may be used to present the indication 404 of a particular caller, with the smart phone using the caller ID function to identify a telephone number used to make the incoming telephone call that may have been provided with the call itself. The caller ID function may then be used to access the user's contact list and match the number with an entry from the list to determine that the phone number is associated with the contact "Russell V." from the user's contact list. Since the user can now verify who is calling the user, the user might be more inclined to accept the call using selector 406.

Figure 5:
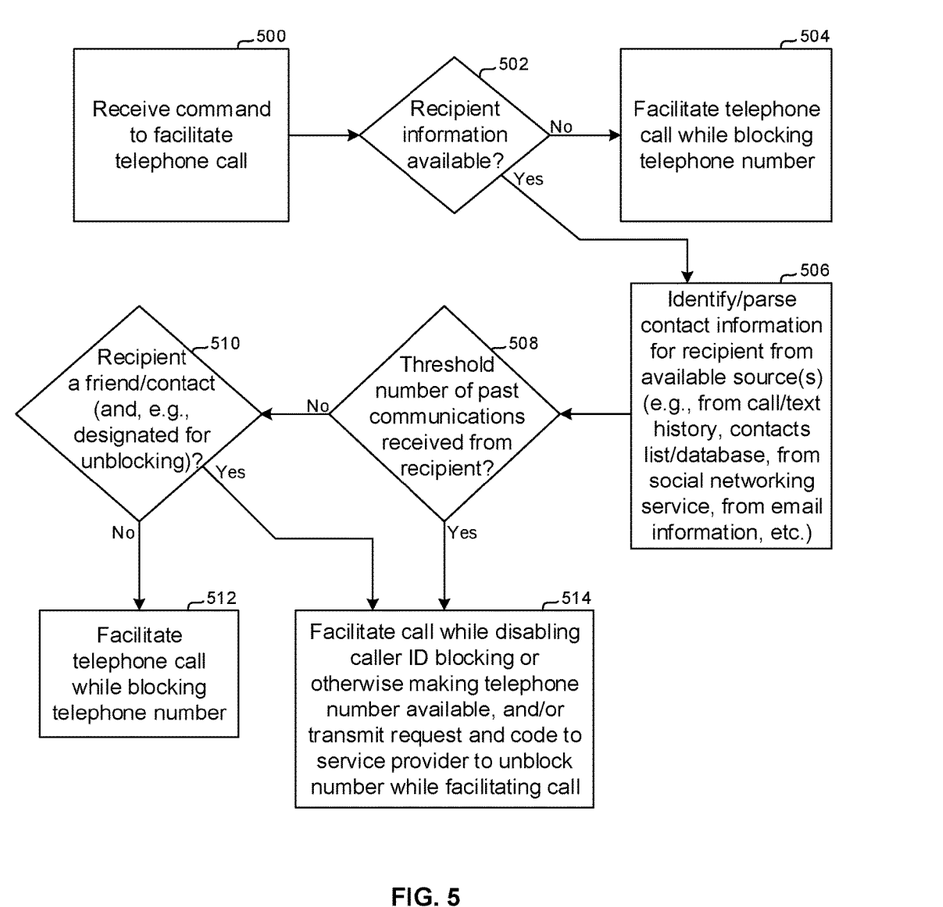
FIG. 5 is a flow chart of an example algorithm in accordance with present principles.

Referring to FIG. 5, it shows example logic that may be executed by a device such as the system 100 in accordance with present principles so that, in at least some instances, a user making a call may have their otherwise restricted or blocked telephone number unblocked, and/or so that the user's caller identification (ID) blocking function may be otherwise disabled. This may be done so that the recipient of the user's call may be able to identify the user as the person calling, and hence be more inclined to answer the call.

It is to be understood that the logic of FIG. 5 may be executed by the user's device or by a telephone services/communications company's computer in conjunction with the user's device while the user's device is used to make a telephone call.

Beginning at block 500, the device may receive a command to facilitate a telephone call, such as a touch command to initiate a telephone call to a particular recipient or a verbal command to initiate a telephone call to a particular recipient. From block 500 the logic may move to decision diamond 502. At diamond 502 the device may determine whether any contact information pertaining to the recipient of the telephone call is available to the device. This may be determined, for instance, by taking the name and/or telephone number of the recipient as indicated by the user and accessing various types of data stored at the device or otherwise accessible to the device (e.g., in cloud storage) to determine whether any information pertaining to the telephone number or name of the recipient is accessible. A negative determination at diamond 502 may cause the logic to proceed to block 504, while an affirmative determination may instead cause the logic to proceed to block 506.

As an example of the decision that may be performed at diamond 502, a contacts list or database stored at the device may be accessed to compare the telephone number indicated by the user to telephone numbers in the contacts list to determine if a number in the list or database matches the number indicated by the user. If no match is identified, the logic may move to block 504. If a match is identified, the logic may instead proceed to block 506. Other examples may include accessing a call history or text message history stored at the device and performing similar comparisons using the phone number indicated by the user.

In any case, at block 504 the device may facilitate the telephone call while blocking the user's telephone number, as may be set as the default preference for the user either at the user's device itself or via the telephone communications company providing telephone service for the user's device.

However, as indicated above, responsive to an affirmative determination at diamond 502 the logic may instead proceed to block 506 rather than block 504. At block 506 the device may identify and parse the contact information for the recipient that is accessible to it for purposes to be described shortly. But first, note that the contact information itself may include information from sources accessible to the device such as call and text message histories, contact lists/databases, social networking accounts associated with the user, email accounts associated with the user, etc.

From block 506 the logic may move to decision diamond 508. At diamond 508, based on the contact information identified and parsed at block 506, the device may determine whether a threshold number of past communications have been received from the recipient. The past communications may have been received at the device and/or by the user even if via a different device. Past communications may include text messages, telephone calls, emails, and even social networking messages, as examples. The threshold number may be more than zero or one, and in some embodiments the threshold number may even be set by the user.

As for the determination itself that may be performed at diamond 508, the device may analyze the past communications and determine whether at least the threshold number of past communications has been received from the recipient. This may be done by accessing a history of the past communications and, for example, adding up each individual call or message that was received to determine whether the threshold has been met. Additionally or alternatively, if a running tally of a certain type of past communications is maintained by the device (e.g., as part of the communications history), the device may access that tally to determine whether the tally is equal to or greater than the threshold number.

An affirmative determination at diamond 508 may cause the logic to proceed to block 514, which will be described shortly. However, first note that a negative determination at diamond 508 may instead cause the logic to proceed to decision diamond 510. At diamond 510 the device may determine whether the recipient of the telephone call is a friend and/or contact of the user. This may be determined by the device, for example, by identifying that the recipient's telephone number as existing in the user's contacts list.

This may also be determined at diamond 510, for example, by identifying in the contacts list a name associated with the telephone number, by identifying via a social networking service a name associated with the telephone number, and/or by performing an Internet search using the telephone number. Once the name of the recipient is identified, the user's social networking account or email account may be accessed to determine if the identified name matches a social networking friend or email contact, respectively, of the user. An affirmative determination may cause the logic to proceed to block 514 as will be described shortly, but a negative determination may instead cause the logic to proceed to block 512.

However, before moving on to the description of block 512, it is to be understood that some users may wish to still have their telephone number automatically blocked or otherwise rendered inaccessible to a recipient when placing a call to the recipient even if the recipient is listed in the user's contacts list, email account information, etc. For example, a mental health professional may wish to call a patient from their personal smart phone to discuss a matter but still not wish that his or her telephone number be made available to the patient when calling, even if the patient is in the professional's contacts list. Thus, in some embodiments, contacts of the user may be designated in the contact list or other contact information as call recipients for which the user's telephone number either should remain blocked or should be unblocked. Accordingly, in these examples the determination at diamond 510 may be not only that, for example, the recipient is a contact of the user as listed in the user's contacts list, but also that the recipient is designated in the contacts list as being a recipient for which the user's telephone number should be made available.

Now describing the aforementioned block 512, at this step the device may facilitate the telephone call initiated by the user while still blocking the user's telephone number or making it inaccessible, as may be the default setting for the device and/or telephone number. The device may thereafter continue to facilitate the telephone call until it concludes.

Reference is now made to block 514, which, to reiterate, may be arrived at based on an affirmative determination at either of diamonds 508 and 510. At block 514 the device may facilitate the telephone call initiated by the user while unblocking the user's telephone number, disabling the user's caller identification (ID) blocking function, or otherwise making the number accessible for presentation at the recipient's device such as by transmitting it to the recipient as metadata along with the call. The foregoing may be performed at block 514 when the user's device is executing the logic of FIG. 5 and the user's telephone number would otherwise be blocked by the user's device itself (e.g., based on a "global" or default call setting for the device), rather than being blocked by the user's telephone communications company.

In instances where the user's telephone number would otherwise be blocked by the user's telephone communications company while facilitating the call from the user to the recipient, but where the logic of FIG. 5 is still being executed by the user's device, at block 514 the device may, along with placing the telephone call itself, transmit a request to unblock the telephone number and/or transmit a predetermined code. The predetermined code may, for example, precede the recipient's telephone number itself as transmitted to the telephone communications company while placing the call, or otherwise be transmitted to the telephone communications company's device while placing the call.

For example, if the recipient's telephone number were (555) 555-5555, the predetermined code and telephone number sequence provided to the telephone communications company may be *82 (555) 555-5555. The predetermined code may then be recognized by the company's device as a command to unblock the user's telephone number while facilitating the call to the recipient. It is to be understood that in this embodiment, the user need not actually provide input dialing *82 himself or herself, and instead this may be done automatically by the device based on one or both of the affirmative determinations made at diamond 508 and 510 and without additional input from the user other than the user specifying the recipient telephone number itself.

In instances where the user's telephone number would otherwise be blocked by the user's telephone communications company while facilitating the call from the user to the recipient, but where the logic of FIG. 5 is instead executed by the telephone communications company's device, at block 514 the device may receive a command to place the call to the recipient. The device may then unblock the user's telephone number while facilitating the call or otherwise make the number accessible for presentation at the recipient's device based on an affirmative determination at one or both of diamonds 508 and 510.

Figure 6:
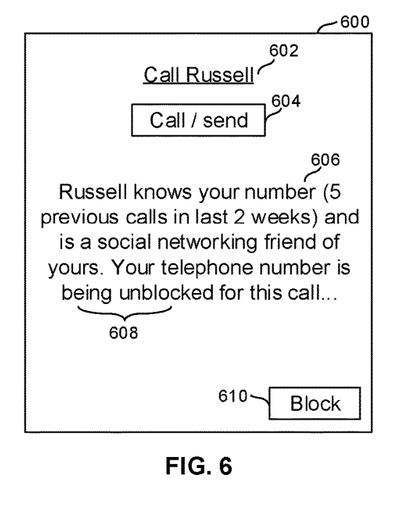
FIGS. 6-10 show various example user interfaces (UIs) in accordance with present principles.

Continuing the detailed description in reference to FIG. 6, it shows an example user interface (UI) 600 that may be presented on the display of a user's device when placing a telephone call to a recipient. The UI 600 may include an indication 602 of the recipient, along with a selector 604 that is selectable to command the device to initiate the telephone call to the recipient. The UI 600 may also include information 606 identified by the user's device as pertaining to the recipient.

By way of example, the information 606 may indicate that the recipient likely already knows the user's telephone number (and hence there would not be much reason to block it) since the recipient has called the user a certain number of times within a threshold time period from the present day. The information 606 may also indicate other contact information related to the recipient, such as the recipient being a social networking friend of the user. The information 606 may be accompanied by an indication 608 that the user's telephone number is being unblocked for the telephone call and/or that the user's caller identification (ID) blocking function is otherwise being disabled.

Also note that a selector 610 may be presented on the UI 600. The selector 610 may be selected to command the device to still block the user's telephone number while facilitating the telephone call to the recipient, notwithstanding the information 606 identified by the user's device.

Figure 7:
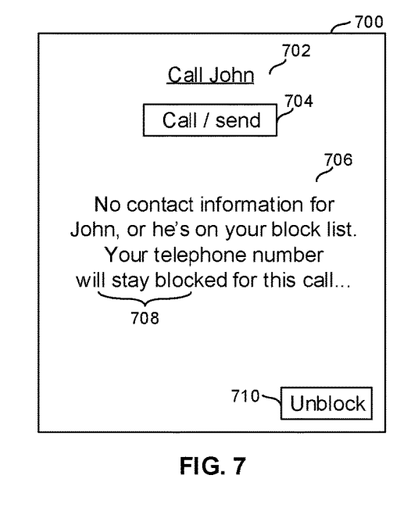

Now in reference to FIG. 7, is shows another example UI 700 that may be presented on the display of a user's device when placing a telephone call to a recipient. The UI 700 may include an indication 702 of the recipient, along with a selector 704 that is selectable to command the device to initiate the telephone call to the recipient. The UI 700 may also include information 706. Distinguishing this example from FIG. 6, the information 706 in this case may indicate either that no contact information was located by the device for the recipient, or that the recipient is designated for blocking and/or is on a list of recipients for which the user's telephone number should be blocked (e.g., depending on specific determinations that might be made by the user's device in accordance with present principles).

The information 706 may be accompanied by an indication 708 that the user's telephone number is being blocked for the telephone call and/or that the user's caller identification (ID) blocking function is otherwise being used. A selector 710 may be presented on the UI 700, with the selector 710 being selectable to command the device to unblock the user's telephone number anyway while facilitating the telephone call to the recipient.

Before moving on to FIG. 8, it is to be understood in reference to FIGS. 6 and 7 that the UIs 600 and 700 may in some instances pertain to transmitting a text message instead of making a call. Accordingly, the selectors 610 and 710 may be selected to respectively block or unblock the user's telephone number when sending a text message to the recipient in accordance with present principles when the source of the text message would be otherwise be unblocked or blocked, respectively.

Figure 8:
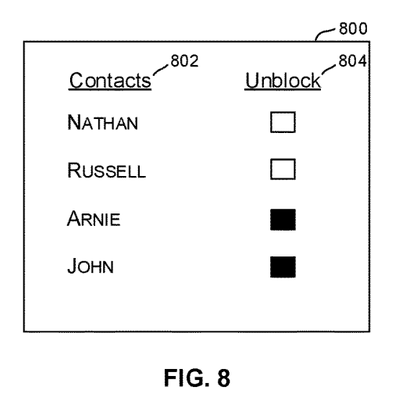

Turning now to FIG. 8, another example UI 800 is shown. The UI 800 may be presented on the display of a user's device so that a user may designate particular contacts as "trusted contacts" for which to unblock the user's telephone number when making a call to that contact. In some embodiments, the UI 800 may be presented as part of a contacts list. Thus, the UI 800 may include a first column 802 listing contacts from the user's contact list. The UI may also include a second column 804 of selectors that may be selected to designate the associated contact listed on the same row as a contact for which to unblock the user's telephone number when making a call to that contact.

Figure 9:
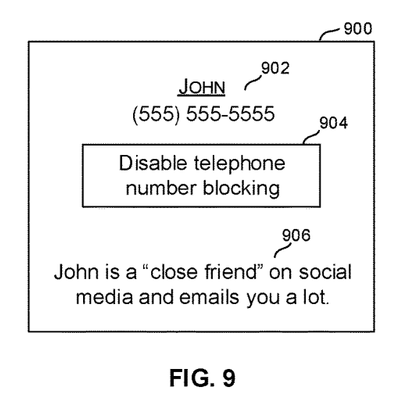

FIG. 9 shows another example of how the user may designate a particular contact for which to unblock the user's telephone number when making a call to that contact. FIG. 9 shows a contact page UI 900 associated with a particular contact that provides information 902 about the contact, such as the contact's name and associated telephone number. The UI 900 also includes a selector 904 that may be selected to designate the contact associated with the information 902 as a contact for which to unblock the user's telephone number when making a call to that contact. The UI 900 may include additional information 906 about the contact, such as the contact being listed as a "close friend" in the user's social media account and such as the contact emailing the user with high frequency. The information 906 may be determined, for example, in accordance with the determinations set forth above in reference to FIG. 5.

Figure 10:
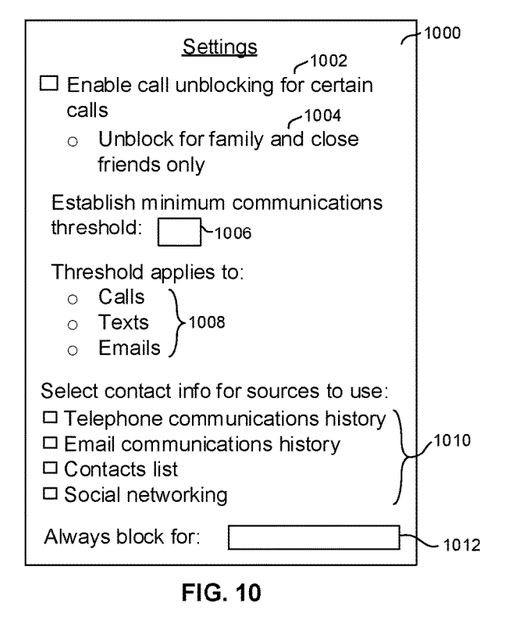

Continuing the detailed description in reference to FIG. 10, it shows an example settings UI 1000 that may be presented on the display of the user's device for configuring call blocking settings in accordance with present principles. Thus, the UI 1000 may include a first option 1002 that is selectable using the check box shown to enable call unblocking in accordance with present principles. For example, the option 1002 may be enabled to configure the user's device to execute the logic of FIG. 5 when the user provides input to place a telephone call. Additionally, note that the option 1002 may include a sub-option 1004 that may be selectable once the option 1002 is enabled. The sub-option 1004 may be selected to designate a particular class of people or contacts of the user for unblocking. In this example, the particular class includes "family and close friends only", as may have been identified based on social networking information for the user that indicates "family" or "close friend" status.

The UI 1000 may also include an input box 1006 at which the user may enter a number to establish as the threshold number of past communications for unblocking the user's telephone number. For instance, a number may be entered into box 1006 to establish the threshold number described above in reference to FIG. 5. The UI 1000 may also include options 1008 for specifying the types of communications to which the threshold number is to be applied. In the example shown, the types include telephone call communications, text message communications (e.g., SMS text messaging), and email communications. Each option 1008 may be selected using the radio button shown adjacent to the given type.

In addition to the foregoing, the UI 1000 may include options 1010 that are each selectable using the adjacent check box to select a type of contact information source to access for determining whether to unblock the user's telephone number in accordance with present principles. In the example shown, the types of sources include a telephone communications history (e.g., a call history and text message history), an email communications history and/or email account, a contacts list and/or contacts database, and a social networking account.

In some embodiments, the UI 1000 may also include an input box 1012 at which a user may enter a name or other identifying information for a person for which the user desires to have their telephone number always blocked when placing a call thereto. Thus, one name, or more than one name, may be input to the box 1012 to designate people for telephone number blocking when the user places a call to that person's associated device (e.g., regardless of any determination that might be made such as an affirmative determination at diamonds 508 and 510 above).

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
   at least one processor;
   a display accessible to the processor; and
   storage accessible to the at least one processor and bearing instructions executable by the at least one processor to:
   identify contact information for a person associated with a second device;
   determine, based on the identification, whether to disable a caller identification (ID) blocking function associated with making calls from the first device;
   responsive to a determination to disable the caller ID blocking function, disable the caller ID blocking function while facilitating a first call from the first device to the second device; and
   present, on the display, a graphical user interface (GUI), the GUI comprising an indication that the caller ID blocking function is being disabled while facilitating the first call from the first device to the second device, the GUI further comprising an indication of at least one reason why the caller ID blocking function is being disabled while facilitating the first call from the first device to the second device.

2. The first device of claim 1, wherein the instructions are executable by the at least one processor to:
   disable the caller ID blocking function while facilitating the first call by making, using the first device and while facilitating the first call, a phone number associated with the first device available for presentation at the second device.

3. The first device of claim 1, wherein the contact information comprises data pertaining to at least one past communication, using a phone number associated with the first device, from the second device that is received at the first device.

4. The first device of claim 3, wherein the at least one past communication comprises a text message from the second device received at the first device in the past.

5. The first device of claim 1, wherein the instructions are executable by the at least one processor to:
   identify the contact information responsive to receipt of a command to facilitate the first call from the first device to second device; and
   disable the caller ID blocking function while facilitating the first call from the first device to the second device at least in part by transmitting a request to a telephone services provider to disable the caller ID blocking function for the first call from the first device to the second device, the request comprising a predetermined code.

6. The first device of claim 1, wherein the reason is indicated in text and wherein the reason indicates that the person already knows a telephone number for the first device.

7. The first device of claim 1, wherein the reason is indicated in text and wherein the reason indicates that the person and a user of the first device are associated with each other via a social networking service.

8. The first device of claim 1, wherein the GUI indicates how many past communications have occurred between first and second devices within a threshold period of time.

9. The first device of claim 1, wherein the GUI comprises a selector that is selectable to enable the caller ID blocking for the first call notwithstanding the determination to disable the caller ID blocking function.

10. A method, comprising:
    identifying, using a first device, first information pertaining to a person associated with a second device;
    determining, based on the identifying, to not block a phone number associated with the first device from being identified at the second device while a first call from the first device to the second device is facilitated;
    permitting, responsive to determining to not block the phone number from being identified at the second device, data indicating the phone number to be presented at the second device while facilitating the first call; and presenting, on a display, a graphical user interface (GUI), the GUI comprising an indication that the phone number is not being blocked for the first call, the GUI further comprising an indication of at least one reason why the phone number is not being blocked for the first call.

11. The method of claim 10, wherein the first information comprises data pertaining to at least one past communication, using the phone number associated with the first device, from the second device that is received at the first device.

12. The method claim 11, wherein the at least one past communication comprises a text message from the second device received at the first device in the past.

13. The method of claim 10, wherein the first information comprises social networking information associated with a user of the first device, wherein the social networking information comprises data pertaining to a social networking friend of the user, and wherein the determining is performed based at least in part on identifying that the social networking friend of the user is associated with the second device.

14. The method of claim 10, wherein the permitting comprises one or more of: transmitting a predetermined code while facilitating the first call, preventing the first device from blocking the phone number from being identified at the second device while the first call from the first device to the second device is facilitated.

15. The method of claim 10, wherein the reason is indicated in text and wherein the GUI indicates a number of past communications between first and second devices.

16. The method of claim 10, wherein the GUI comprises a selector that is selectable to block the phone number for the first call notwithstanding the determining to not block the phone number from being identified at the second device.

17. A method, comprising:
facilitating a telephone call between a first device and a second device;
determining whether to block a phone number associated with the first device from being presented at the second device while facilitating the telephone call between the first device and the second device;
blocking the phone number so that the phone number is not presented at the second device, the blocking being performed responsive to determining to block the phone number from being presented at the second device while facilitating the telephone call;
presenting, on a display, a graphical user interface (GUI), the GUI comprising text indicating at least one reason why the phone number is being blocked for the telephone call.

18. The method of claim 17, wherein the method is performed by a third device operated by a telephone communications company.

19. The method of claim 17, wherein the method is performed by the first device.

20. The method of claim 17, wherein the GUI comprises a selector that is selectable provide a command for the phone number to not be blocked for the telephone call notwithstanding the determining to block the phone number from being presented at the second device while facilitating the telephone call.

* * * * *